United States Patent
Eilerts et al.

(10) Patent No.: US 6,291,608 B1
(45) Date of Patent: Sep. 18, 2001

(54) POLYMERIZATION CATALYST SYSTEM AND POLYMERIZATION PROCESS

(75) Inventors: Nancy W. Eilerts, Bartlesville; Bryan Hauger, Claremore; M. Bruce Welch; Harold R. Deck, both of Bartlesville, all of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/221,281

(22) Filed: Dec. 23, 1998

(51) Int. Cl.$^7$ ................. C08F 4/16; C08F 4/26; C08F 4/44

(52) U.S. Cl. .......... 526/115; 526/116; 526/117; 526/160; 526/161; 526/171; 526/172; 502/155; 502/152

(58) Field of Search ..................... 526/160, 161, 526/171, 172, 348.5, 348.6, 115, 116, 117; 502/155

(56) References Cited

U.S. PATENT DOCUMENTS

| | | | |
|---|---|---|---|
| 4,530,914 | * | 7/1985 | Ewen et al. ............ 502/113 |
| 4,937,299 | * | 6/1990 | Ewen et al. ............ 526/119 |
| 4,939,217 |  | 7/1990 | Stricklen ............... 526/114 |
| 5,032,562 |  | 7/1991 | Lo et al. ................ 502/111 |
| 5,395,810 | * | 3/1995 | Shamshoum et al. ...... 502/113 |
| 5,622,906 | * | 4/1997 | Pettijohn ............... 502/104 |
| 5,643,846 | * | 7/1997 | Reddy et al. ........... 502/104 |
| 5,714,427 | * | 2/1998 | Winter et al. .......... 502/117 |
| 6,114,483 | * | 9/2000 | Coughlin et al. ........ 526/172 |

FOREIGN PATENT DOCUMENTS

WO 96/23010   8/1996  (WO) ............. C08F/210/16

OTHER PUBLICATIONS

Z. Naturforsch B; Anorg. Chem. Organ. Chem., vol. 36B, (Dieck et al., 1981, pp. 823–832).
J. Am. Chem. Soc., vol. 117, (Brookhart et al, 1995, pp. 6414–6415).
Polymer Preprints, vol. 37, No. 1 (Brookhart et al., Mar. 1996).

* cited by examiner

*Primary Examiner*—David W. Wu
*Assistant Examiner*—R. Harlan
(74) *Attorney, Agent, or Firm*—Edward L. Bowman

(57) ABSTRACT

A process is provided to prepare polyolefins having a multimodal molecular weight distribution comprising contacting at least one mono-1-olefin in a polymerization zone, under polymerization conditions, with a dual catalyst system comprising a first catalyst system which comprises a metallocene catalyst and a cocatalyst and a second catalyst system which comprises diimine nickel complexes which further comprise additional ligands selected from the group consisting of -deprotoned-β-diketones, -deprotoned-β-ketoesters, halogens and mixtures thereof. The resultant, recovered polymer has at least a bimodal, or broad, molecular weight distribution.

21 Claims, No Drawings

POLYMERIZATION CATALYST SYSTEM AND POLYMERIZATION PROCESS

BACKGROUND OF THE INVENTION

This invention relates to a method for preparing polyolefins having a broadened or multimodal molecular weight distribution.

Polyolefins having a multimodal molecular weight distribution (MWD), such as polyethylene, can be made into articles by a variety of methods, including, but not limited to, extrusion molding, thermoforming and rotational molding, and have advantages over typical polyolefins lacking a multimodal MWD. Polyolefins having a multimodal MWD process more easily, i.e., they can be processed at a faster throughput rate with lower energy requirements. At the same time, such polymers can exhibit reduced melt flow perturbations and are preferred because of improved properties for applications such as blow molding and/or high strength films. Polymers having a multimodal MWD generally are characterized by having a broad MWD, or more that one MWD peak, as reflected by size exclusion chromatography (SEC) curves.

There are several known methods of producing polyolefins having a multimodal MWD; however, each method has its own disadvantages. For example, polyolefins having a multimodal MWD can be made by employing two distinct and separate catalyst systems in the same reactor, each producing a polyolefin having a different MWD; however, catalyst feed rates are usually difficult to control and the catalysts can have a detrimental effect on each other. Polymer particles produced from a dual, or even multi-, catalyst system frequently are not in uniform size. Thus, segregation of the polymer during storage and transfer can produce non-homogeneous products. Polyolefins having a multimodal MWD also can be made by sequential polymerization in two or more separate reactors or made by blending polymers of different MWD during processing; however, both of these methods increase capital cost and problems discussed earlier regarding polymer segregation can occur.

SUMMARY OF THE INVENTION

Therefore, it is an object of the present invention to produce polyolefins having a multimodal, or broadened, molecular weight distribution.

It is a further object of the present invention to provide an improved process for production of polyolefins having a multimodal, or broadened molecular weight distribution.

In accordance with the present invention, polyolefins having a multimodal molecular weight distribution are prepared by contacting at least one mono-1-olefin in a polymerization zone, under polymerization conditions, with a dual catalyst system comprising a first catalyst system which comprises a metallocene catalyst and a cocatalyst and a second catalyst system which comprises diimine nickel complexes which further comprise additional ligands selected from the group consisting of α-deprotoned-β-diketones, α-deprotonated-β-ketoesters, halogens and mixtures thereof. The resultant, recovered polymer has at least a bimodal, or broad, molecular weight distribution.

DESCRIPTION OF THE PREFERRED EMBODIMENTS

In accordance with the present invention, a dual catalyst system which comprises two different catalyst systems is used to polymerize olefins to produce a polyolefin having a multimodal, or broad, molecular weight distribution. The first catalyst system can be referred to as a metallocene catalyst system which comprises a metallocene catalyst component and a cocatalyst component. As used in this disclosure, the term "metallocene catalyst" includes organometallic compounds of the formula;

wherein each L is a bulky organo ligand, each A is a replaceable group, M is a transition metal selected from Groups III–VI and VIII of the Periodic Table including lanthanide and actinide metals, and m and n are integers such that the total ligand valency corresponds to the valence of M. The ligands L and A can be bridged to each other, and if two L and/or A ligands are present they also may be bridged. The metallocene compounds may be full-sandwich bonded having two or more ligands each having a cyclopentadienyl structure or half-sandwich compounds having only one ligand having a cyclopentadienyl structure. Preferably, at least one ligand L has a multiplicity of bonded atoms, preferably carbon atoms, and a cyclic structure such as a cyclopentadienyl ligand or any other ligand capable of eta-5 bonding to M.

Examples of typical removable groups A include halides such as chloride, hydrocarbyls such as phenyl or alkyl, or other univalent anionic ligands. The terms "metallocene" is used herein, thus includes the catalyst of the type disclosed in U.S. Pat. No. 5,055,438, herein incorporated by reference. The currently preferred type of metallocene is a bridged sandwich bonded metallocene having polymerizable substituents such as those covered by the claims of U.S. Pat. No. 5,565,952, herein incorporated by reference.

The cocatalyst used with the metallocene component of the first catalyst system must be an organoaluminoxane component which comprises an oligomeric aluminum compound having repeating units of the formula

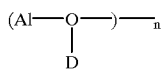

Some examples often are represented by the general formula of $(D-Al-O)_n$ or $D(D-Al-O-)_nAlD_2$. In a general aluminoxane formula, D can be a $C_1-C_5$ alkyl radical for example, such as methyl, ethyl, propyl, butyl, or pentyl and "n" is an integer from 1 to about 50. Most preferably, D is methyl and "n" is at least 4. Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. While not wishing to be bound by theory, it is believed that the reaction of an aluminum alkyl with a limited amount of water can yield a mixture of linear and cyclic species of aluminoxanes.

Preferably, the metallocene catalyst and aluminoxane cocatalyst components of the first catalyst system are combined to form a metallocene catalyst system in the presence of a suitable liquid to form a catalyst system. It is preferred that the liquid catalyst system be prepared using an organic liquid in which the aluminoxane is at least partially soluble. Currently preferred liquids are hydrocarbons such as isobutane, hexane and toluene. Typically, some aromatic liquid solvent is employed such as, for example benzene, toluene, ethylbenzene, diethylbenzene, and mixtures thereof. The amount of liquid to be employed is not particularly critical. Nevertheless, the amount preferably should be such as to dissolve the product of the reaction between the metallocene and the aluminoxane, provide desirable polymerization viscosity for any desired catalyst system prepolymerization, and to permit good mixing. The temperature preferably is kept below that which would cause the metallocene to decompose. Typically, a temperatures within a range of −50° C. to 100° C. are chosen. Preferably, the metallocene, aluminoxane, and liquid diluent are combined at room temperature, i.e., around 10 to 30° C. The reaction between the aluminoxane and metallocene is relatively rapid. The reaction rate can vary depending upon the ligands of the metallocene. It is generally desired that the aluminoxane and metallocene be contacted for at least about a minute to about 1 hour.

Optionally, for ease of use, the metallocene and MAO can be combined in the polymerization reactor in-situ. Thus, the metallocene and MAO are added to the reactor in separate feed streams, usually each in a suitable liquid, as described above.

The second catalyst system used in the invention can be referred to as a diimine nickel complex which further comprise additional ligands selected from the group consisting of α-deprotonated-β-diketones, α-deprotonated-β-ketoesters, halogens and mixtures thereof having a general formula as shown below in Compounds I, II, and III, Compound I

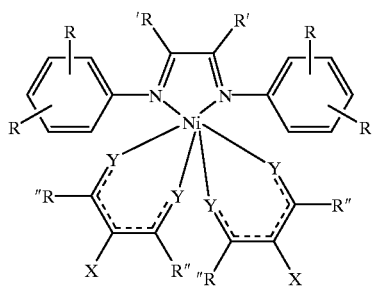

Compound II

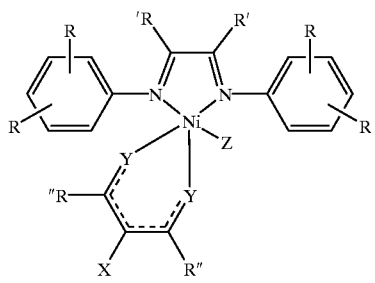

Compound III

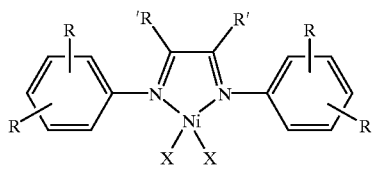

wherein R can be the same or different and is selected from the group consisting of branched and/or linear alkyl or aromatic groups having from about 1 to about 10, preferably from about 1 to about 8, carbon atoms per alkyl group and R can be in any position on the aromatic ring; and R' can be the same or different and is selected from the group consisting of hydrogen and linear, branched, cyclic, bridging, aromatic, and/or aliphatic hydrocarbons, having from about 1 to about 70 carbon atoms per radical group.

R substituents on the aromatic rings of the diimine nickel complex can be the same or different, and are selected from the group consisting of branched or linear, aliphatic or aromatic groups having from about 1 to about 8 carbon atoms per alkyl group. Although hydrogen can be used, hydrogen can inhibit synthesis of the ligand. R groups having more than about 8 carbon atoms per group can result in a catalyst system with lower activity and/or productivity. While not wishing to be bound by theory, it is believed that larger substituent groups can cause steric hindrance in the catalyst system, thereby which can decrease catalyst system activity and/or productivity. Exemplary alkyl substituents are selected from the group consisting of methyl, ethyl, propyl, isopropyl, butyl, isobutyl, tert-butyl, phenyl groups, and mixtures of two or more thereof. Preferably, the R substituent is an electron-donating species, selected from the group consisting of linear or branched aliphatic groups having from about 1 to about 5 carbon atoms per group. Most preferably, the R groups are both the same and are selected from the group consisting of methyl and isopropyl, due to commercial availability and ease of synthesis of the ligand.

The R group can be in any position, i.e., from 2 to 6, on the aromatic ring. Preferably, the R group, which can be the same or different, is either in the 2 and/or 6 position, due to ease of synthesis. Most preferably, for best catalytic activity and productivity, both R groups are the same and are in the 2 and 6 positions on the aromatic ring.

R' substituents can be the same or different and are selected from the group consisting of hydrogen and branched, linear, cyclic, aromatic or aliphatic radicals having from about 1 to about 70 carbon atoms per radical. Further, the R' substituents can be linked, or joined, across the carbon-carbon bridge between the two nitrogen atoms. While not wishing to be bound by theory, it is believed that radicals having more than 70 carbon atoms can add to the steric hindrance of the catalyst systems and hinder catalyst activity and productivity. Preferably, the R' substituent group is selected from the group consisting of hydrogen and branched, linear, cyclic, aromatic or aliphatic radicals having from about 1 to about 20 carbon atoms per radical, due to commercial availability and ease of synthesis of the ligand. Most preferably, the R' substituent groups are the same or a link across the carbon-carbon bridge between the nitrogen atoms, and the R' substituent is selected from the group consisting of hydrogen and branched, linear, cyclic, aromatic or aliphatic radicals having from about 1 to about 12 carbon atoms per radical, for the reasons given above. Exemplary R' substituents include, but are not limited to, hydrogen, methyl, ethyl, propyl, phenyl, taken together acenaphthyl or cyclobutadienyl. Preferably, the R' substituents are identical and are selected from the group consisting of hydrogen, methyl and acenaphthyl for best resultant catalyst system activity and productivity.

R"CYCXCYR" substituents, or ligands, on the diimine nickel complex can be the same or different and are selected from the group consisting of α-deprotonated-β-diketones, in which R" can be the same or different, α-deprotonated-β-ketoesters, halogens and mixtures thereof. The α-deprotonated-β-diketones and α-deprotonated-β-ketoesters can be derived from β-diketone and β-ketoester ligand precursors. Exemplary ligands precursors include, but are not limited to, compounds selected from the group consisting of 2,4-pentanedione, 1,1,1,5,5,5-hexafluoro-2,4-pentanedione, allylacetonacetate, benzoylacetonate, benzoyl-1,1,1-trifluoroacetone, 1,1,1-trifluoro-2,4-pentanedione, 1-chloro-1,1-difluoroacetylacetone, methyl-4,4,4-trifluoroacetoacetate, 1,1,1-trifluoro-5,5-dimethyl-2,4-pentanedione, ethyl α-methyl-4,4,4-trifluoroacetoacetate, 4,4,4-trifluoro-1-(2-furyl)-1,3-butanedione, and 2,2-dimethyl-6,6,7,7,8,8,8-heptafluoro-3,5-octanedione. Preferably, ligand precursors are selected from the group consisting of 2,4-pentanedione, 1,1,1,5,5,5-hexafluoro-2,4-pentanedione, 1,1,1-trifluoro-2,4-pentanedione, 1-chloro-1,1-difluoroacetylacetone, methyltrifluoroacetoacetate, 1,1,1-trifluoro-5,5-dimethyl-2,4-pentanedione, and ethyl α-methyl-4,4,4-trifluoroacetoacetate. Most preferably, ligands include, but are not limited to 2,4-pentanedione, 1,1,1,5,5,5-hexafluoro-2,4-pentanedione, 1,1,1-trifluoro-2,4-pentanedione, 1-chloro-1,1-difluoroacetylacetone, and 1,1,1-trifluoro-5,5-dimethyl-2,4-pentanedione for best catalyst system activity as well as best polymer product properties.

R" and X can be the same or different and are selected from the group consisting of hydrogen, linear, branched, cyclic, bridging, aromatic, and aliphatic hydrocarbons and mixtures of any two or more of these radicals having from about 1 to about 70 carbon atoms per radical group.

The group Z of the diimine nickel complex is selected from the group consisting of fluorine, chlorine, bromine, iodine, and mixtures thereof. Preferably, the halogen is selected from the group consisting of chlorine and/or bromine for high catalyst activity and productivity. Most preferably, the halogen is chlorine for best catalyst system activity and productivity.

Y is independently selected from the group consisting of oxygen, sulfur and selenium.

The diimine nickel complex catalyst system disclosed in this application can be prepared by any method known in the art. For example, approximate molar equivalents of a diimine ligand and a nickel compound can be contacted in the presence of any compound that can dissolve both the diimine ligand and nickel compound, either partially or completely. The contacting conditions can be any conditions suitable to effect the formation of a diimine nickel complex. Preferably, for best product results, the diimine ligand/nickel complex mixture is contacted at room temperature under a dry atmosphere for any amount of time sufficient to form the diimine nickel complex. Completion of the formation of the diimine nickel complex can be evidenced by a color change. Generally, contacting times of about 8, and preferably 12 hours are sufficient. Usually, as a result of the preparation procedure, the resultant diimine nickel complex will comprise from about 3 to about 20, preferably from about 5 to about 15, weight percent nickel, based on the total mass of the diimine nickel complex. The presence of oxygen is not thought to be detrimental to this aspect of the preparation procedure.

In general, diimine ligands are contacted with a nickel β-diketonate or nickel β-diketonate halide to form diimine nickel complexes. Typical syntheses of nickel complexes related to those described in this invention can be found in tom Dieck, H., Svoboda, M., and Greiser, T., *Z. Naturforsch B: Anorg. Chem. Organ. Chem.*, Vol. 36b, pp. 823–832 (1981), herein incorporated by reference. Usually, for ease of catalyst system preparation, the diimine ligand is prepared first. The catalyst preparation procedure can vary, depending on the substituents on the diimine ligand. For example, to prepare a specific diimine ligand, wherein R' is hydrogen, a three-component mixture is prepared. A two-fold molar excess of aniline, containing the desired R substituents ($R_nC_6H_{(7-n)}N$, wherein n=1,2), is contacted with a dialdehyde, such as, for example, glyoxal (CHOCHO), in the presence of a compound capable of being a solvent for both organic and aqueous compounds. Exemplary solvents for both organic and aqueous compounds include, but are not limited to, methanol, ethanol and/or tetrahydrofuran (THF). The mixture can be contacted, preferably refluxed, under any atmosphere to form the desired ligand. Preferably, the mixture is refluxed for at least 10, preferably 20 minutes, cooled and the desired ligand can be recovered. Generally, after refluxing and cooling, the ligand can be recovered in a crystalline form.

To prepare another specific diimine ligand wherein the R' group is anything other than hydrogen, a similar procedure can be used. For example, at least a two-fold molar excess of aniline or a substituted aniline can be combined with a compound capable of dissolving both organic and aqueous compounds and a very minor amount of formic acid. Then, about a one molar equivalent of an alpha-diketone (R'COCOR') can be added to the mixture. The mixture can be stirred under atmospheric conditions of temperature and pressure, until the reaction is complete and the desired ligand is formed. Preferably, water is absent from the reaction mixture. Generally, the reaction will be complete in about 18, preferably 24 hours. A crystalline ligand product can be recovered according to any method known in the art.

The nickel bis(β-diketonate), nickel bis(β-ketoester), nickel β-diketonate halide and nickel β-ketoester halide can be prepared by any method known in the art. Typical syntheses of such nickel complexes can be found in Bullen, G. J., Mason, R., and Pauling, P., *Inorganic Chemistry*, Vol. 4, pp. 456–462 (1965), herein incorporated by reference. Alternatively, and especially in the case of nickel β-diketonate halides and nickel β-ketoester halides, the salt of the β-diketone or β-ketoester can be prepared then reacted with the correct quantity of nickel halide. A mixture of an appropriate Bronsted base, such as but not limited to sodium or potassium hydride or sodium or potassium methoxide, is mixed with a solvent capable of dissolving or becoming miscible with the β-diketone or β-ketoester. Exemplary solvents include toluene, benzene, methanol, or ethanol. One molar equivalent of the β-diketone or β-ketoester is added slowly to this mixture. Reaction is known to occur as evidenced by the evolution of heat and a change in the physical appearance of the mixture. Once all reactants have contacted, reaction times from 4 to 12 hours are sufficient to ensure complete reaction. If the product salt of the β-diketone or β-ketoester is not soluble in the solvent chosen, the solvent is removed by filtration or vacuum and the salt dissolved in a solvent in which it is soluble. Exemplary solvents include methanol and ethanol. This solution is then added to a one half molar equivalent of nickel halide that has been suspended or dissolved in the same solvent or a solvent with which the first solvent is miscible. The preceding reactant ratio results in the formation of the nickel bis(β-diketonate) or nickel bis(β-ketoester). If the nickel β-diketonate halide or nickel β-ketoester halide are desired, the solution is added to one molar equivalent of nickel halide as described. Reaction is known to occur as evidenced by the formation of a soluble green species. Reaction times of 4 to 12 hours are sufficient to ensure complete reaction. The byproduct sodium or potassium halide salt is then removed from the reaction product by filtration and/or centrifugation. The solvent is removed by vacuum to yield the nickel complex used in the nickel diimine complex synthesis.

After formation of a diimine nickel complex, the diimine nickel complex can be recovered by any method known in the art, such as, for example evaporation and/or vacuum filtration of the solvent. Further, if desired, the diimine nickel complex can be further purified by washing. One exemplary wash compound can be heptane. The diimine nickel complex catalyst system can be recovered and used as a solid, heterogeneous catalyst system.

The two catalyst systems can be combined in accordance with any method know in the art, such as, for example, contacting prior to introduction into a polymerization reactor, fed to a polymerization reactor in separate feed streams, or generated in a polymerization reactor in-situ. Preferably, each catalyst system is fed to the polymerization reactor in a separate feed stream.

The amounts of each catalyst system used for polymerization can be any amount effective to polymerize olefins. Usually, the weight ratio of the metallocene catalyst system, without the aluminoxane component, to the diimine nickel complex catalyst system is within a range of about 0.1:1 to about 10:1, i.e., 0.1 parts by weight of metallocene catalyst system combined with about 1 part by weight of diimine nickel complex catalyst system to about 10 parts by weight of metallocene catalyst system combined with about 1 part by weight of diimine nickel complex catalyst system. Preferably, the weight ratio of the metallocene catalyst system, without the aluminoxane component, to the diimine nickel complex catalyst system is within a range of about 0.3:1 to about 7:1. Most preferably the metallocene catalyst system, without the aluminoxane component, to the diimine nickel complex catalyst system is within a range of 0.5:1 to 5:1 for best reactivity, productivity and optimization of resultant polymer products.

Reactants, Polymerization and Polymer Products

Polymers produced according to the process of this invention can be homopolymers of mono-1-olefins or copolymers of at least two different mono-1-olefins. Exemplary mono-1-olefins useful in the practice of this invention include, but are not limited to mono-1-olefins having from about 2 to about 10 carbon atoms per molecule. Preferred mono-1-olefins include, but are not limited to ethylene, propylene, 1-butene, 1-pentene, 1-hexene, 1-heptene, 3-methyl-1-butene, 4-methyl-1-pentene, 1-octene, 1-nonene and 1-decene. If the reaction product is a copolymer, a mono-1-olefin monomer can be polymerized with at least one mono-1-olefin comonomer which is a different alpha-olefin from the monomer, usually having from about 2 to about 10, preferably from 3 to 8 carbon atoms per molecule. Exemplary comonomers include, but are not limited to, propylene, 1-butene, 1-pentene, 1-hexene, 1-octene, 4-methyl-1-pentene, and mixtures thereof. Preferably, if the monomer is ethylene, the comonomer is 1-hexene and/or 4-methyl-1-pentene, in order to achieve maximum polymer product toughness. Preferably, if the monomer is propylene, the comonomer is ethylene and/or butene in order to achieve maximum polymer product toughness and clarity.

Polymerization of the monomer and optional comonomer must be carried out under slurry, or particle form, polymerization conditions wherein the temperature is kept below the temperature at which polymer swells significantly. Slurry polymerization processes are much easier to operate and maintain than other polymerization processes; a polymer product produced by a slurry process can be recovered much more easily. Two preferred polymerization methods for the slurry process are those employing a loop reactor of the type known in the art and those utilizing a plurality of stirred reactors either in series, parallel or combinations thereof wherein the reaction conditions can be the same or different in the different reactors. Such polymerization techniques are well-known in the art and are disclosed, for instance, in Norwood, U.S. Pat. No. 3,248,179, the disclosure of which is hereby incorporated by reference.

The slurry process generally is carried out in an inert diluent (medium), such as, for example, a paraffin, cycloparaffin, and/or aromatic hydrocarbon. Preferably, the inert diluent is an alkane having less that about 12 carbon atoms per molecule, for best reactor operation and polymer product. Exemplary diluents include, but are not limited to propane, n-butane, isobutane, n-pentane, 2-methylbutane (isopentane), and mixtures thereof. Isobutane is the most preferred diluent due to low cost, ease of use, and ease of separation from the polymer product.

The temperature of the polymerization reactor, or reaction, zone, when using isobutane as the reactor diluent, according to this invention, is critical and must be kept within a range of about 5° C. to about 100° C. (41° F.–212° F.) and preferably within a range of about 10° C. to about 70° C. (500° F.–158° F.). Most preferably, the reaction zone temperature is within a range of 20° C. to 60° C. (68° F.–140° F.) for best catalyst activity and productivity. Reaction temperatures below about 10° C. can be ineffective for polymerization.

Pressures in the slurry process can vary from about 100 to about 1000 psia (0.76–7.6 MPa), preferably from about 200 to about 700 psia. Most preferably, the reaction zone is maintained at a pressure within a range of 300 to 600 psia for best reactor operating parameters and best resultant polymer product. The catalyst system is kept in suspension and is contacted with the monomer and comonomer(s) at sufficient pressure to maintain the medium and at least a portion of the monomer and comonomer(s) in the liquid phase. The medium and temperature are thus selected such that the polymer or copolymer is produced as solid particles and is recovered in that form. Catalyst system concentrations in the reactor can be such that the catalyst system content ranges from 0.001 to about 1 weight percent based on the weight of the reactor contents.

The catalyst system and methylaluminoxane (MAO) can be added to the reactor in any order to effect polymerization. For example, catalyst system can be added, then some reactor diluent, such as isobutane, followed by MAO, then more diluent and finally, monomer and optional comonomer. However, as stated earlier, this addition order can be varied, depending on equipment availability and/or desired polymer product properties. Preferably, the catalyst system and MAO are not precontacted prior to addition to the polymerization reactor due to a possible decrease in catalyst activity.

The amount of catalyst system and MAO added to the reactor can vary. Generally, a molar excess of MAO is present, relative to the diimine nickel complex. Preferably, the aluminum to nickel (Al:Ni) molar ratio is less than about 1500:1, more preferably within a range of about 50:1 to about 600:1. Most preferably, the molar ratio of aluminum to nickel is within a ratio of 100:1 to 400:1 for best catalyst system activity and productivity.

Polymers produced in accordance with this invention are very unique because of a significant amount of short chain branching which can be produced even in the absence of a comonomer added to the reactor. This short chain branching is evidence that some sort of comonomers are produced in-situ in the reactor and are incorporated into the polymer and/or that the catalyst can form short chain branches by rearrangement of the main polymer chain through successive hydride elimination, olefin rotation, and hydride re-addition reactions. This series of steps may not involve discrete intermediates and may rather be a concerted or continuous series of reactions with no distinct intermediates formed. Such rearrangements can be termed "chain walking". Chain walking can be described by the active metal catalyst, i.e. nickel, "walking" a distance along the polymer backbone during polymerization and hence, the short chain branch length can be dictated by the rate of ethylene insertion relative to the combined rates of hydride elimination, olefin rotation, and hydride re-addition. Usually polymers produced in accordance with this invention, wherein no comonomer is added to the polymerization reactor comprise up to about 3000, and generally from about 20 to about 3000 short chain branches per 10,000 (or from about 2 to about 300 short chain branches per 1000) backbone carbon atoms of the polymer. Furthermore, the short chain branches produced comprise both odd and even carbon branches, i.e., branches comprising an odd number of carbon atoms per short chain branch, as well as branches comprising an even number of carbon atoms per short chain branch.

If desired, optional addition of one or more comonomers can be added to the polymerization reactor. The affirmatively added comonomers can further increase the amount of short chain branching in the resultant polymer, or copolymer. Polymers produced with the addition of a comonomer can have a greater number of short chain branches in addition to those generated as described above. If a comonomer is affirmatively added to the polymerization reactor, these polymers usually can comprise up to about 3500, and generally from about 20 to about 3500, short chain branches per 10,000 backbone carbon atoms of polymer.

A further understanding of the invention and its advantages is provided by the following examples.

EXAMPLES

The following Examples illustrate various aspects of the invention. Data are included for each example about polymerization conditions, as well as the resultant polymer. All chemical handling, including reactions, preparation and storage, was performed under a dry, inert atmosphere (usually nitrogen). Unless otherwise indicated, bench scale polymerizations were completed in a 2.6 liter autoclave reactor at the desired temperature using an isobutane (1.2 liter) slurry. The reactor was heated to 120° C. and purged with nitrogen for about 20 minutes. The reactor then was cooled to the desired polymerization temperature and purged with isobutane. A known quantity (mass) of diimine nickel complex catalyst was charged to the reactor against a countercurrent of isobutane. A known quantity (mass) of metallocene catalyst also was charged to the reactor against a countercurrent of isobutane. The agitator was set at 490 rpm. If hydrogen was charged to the reactor, hydrogen addition was followed by isobutane. The desired quantity of methylaluminoxane (MAO) (10 weight % in toluene) was charged directly to the reactor via syringe. After the full volume of isobutane was added, ethylene was added to bring the total reactor pressure to 550 psig. Ethylene was fed on demand and the polymerization reaction terminated when ethylene flow into the reactor ceased. Run times for each polymerization reaction are provided in the Tables.

The abbreviations for the catalyst systems used are as follows:

[(iPr$_2$Ph)$_2$DABMe$_2$]Ni(hfacac)$_2$-
  N,N'-bis(2,6-diisopropylphenyl)-2,3-butanediimine nickel(II)
  bis(1,1,1,5,5,5-hexafluoroacetylacetonate)
(n-BuCp)$_2$ZrCl$_2$-bis(n-butylcyclopentadienyl) zirconium dichloride
Me$_2$SiCp$_2$ZrCl2-dimethylsilylbis(cyclopentadienyl) zirconium dichloride In general, catalyst systems used for polymerization in the Examples were prepared as described in this application.

Mass Catalyst (grams) is the mass of catalyst system charged to the polymerization reactor for each Run. Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C. High load melt index (HLMI, g/10 mins) was determined in accordance with ASTM D1238 at 190° C. with a 21,600 gram weight. Melt index (MI, g/10 mins) was determined in accordance with ASTM D1238 at 190° C. with a 2,160 gram weight. Size exclusion chromatography (SEC) analyses were performed at 140° C. on a Waters, model 150 GPC with a refractive index detector. A solution concentration of 0.17 to 0.65 weight percent in 1,2,4-trichlorobenzene was found to give reasonable elution times. Reported weight average molecular weight ($M_w$) and number average molecular weight ($M_n$) values (results) need to be multiplied by a factor of 1000 for the actual value. Heterogeneity Index (HI) is $M_w/M_n$. Reported Al:Ni ratio values are expressed as molar ratio values. Values that were not determined are represented as "nd" in the Tables.

EXAMPLE 1

This example shows that a dual catalyst system comprising a first catalyst system which comprises a metallocene catalyst and an alkyl aluminoxane cocatalyst and a second catalyst system which comprises a diimine nickel complex having additional ligands selected from the group consisting of α-deprotonated-β-diketones,α-deprotonated-β-ketoesters, halogens and mixtures thereof can produce a polymer that has at least a bimodal, or broadened, molecular weight distribution. Polymerizations in the following Runs were carried out as described above, with a reactor pressure of 550 psig ethylene in isobutane slurry at temperatures varying from 40° C. to 123° C. MAO was added in a 10% wt/wt solution in toluene. Polymerization reaction conditions and results are listed below in Table 1. Table 2, below, shows properties of the resultant polymers.

TABLE 1

| Run | Nickel Catalyst | Mass Catalyst, g | Metallocene Catalyst | Mass Metallocene, g | Me/Ni Catalyst System Weight Ratio | Reactor Temp, ° C. | MAO, mls | H$_2$, psi | Total grams polymer recovered | Productivity, gpol/g Ni complex |
|---|---|---|---|---|---|---|---|---|---|---|
| 101 | [(iPr$_2$Ph)$_2$DABMe$_2$]Ni(hfacac)$_2$ | 0.0118 | (n-BuCp)$_2$ZrCl$_2$ | 0.0093 | 0.79 | 60 | 10 | 10 | 249 | 21100 |
| 102 | [(iPr$_2$Ph)$_2$DABMe$_2$]Ni(hfacac)$_2$ | 0.0083 | (n-BuCp)$_2$ZrCl$_2$ | 0.005 | 0.60 | 50–123 | 10 | 10 | 470 | 56600 |
| 103 | [(iPr$_2$Ph)$_2$DABMe$_2$]Ni(hfacac)$_2$ | 0.0110 | (n-BuCp)$_2$ZrCl$_2$ | 0.0048 | 0.44 | 50–69 | 10 | 10 | 69 | 6270 |

TABLE 1-continued

| Run | Nickel Catalyst | Mass Catalyst, g | Metallocene Catalyst | Mass Metallocene, g | Me/Ni Catalyst System Weight Ratio | Reactor Temp, °C. | MAO, mls | $H_2$, psi | Total grams polymer recovered | Productivity, gpol/g Ni complex |
|---|---|---|---|---|---|---|---|---|---|---|
| 104 | [(iPr$_2$Ph)$_2$DABMe$_2$]Ni(hfacac)$_2$ | 0.0215 | (n-BuCp)$_2$ZrCl$_2$(a) | 0.005 | 0.23 | 40–78 | 5 | 10 | 217 | 1010 |
| 105 | [(iPr$_2$Ph)$_2$DABMe$_2$]Ni(hfacac)$_2$ | 0.0126 | none | 0 | — | 40 | 5 | 10 | 6 | 480 |
| 106 | none | 0 | (n-BuCp)$_2$ZrCl$_2$ | 0.0056 | — | 40 | 5 | 10 | 143 | 25500 |
| 107 | [(iPr$_2$Ph)$_2$DABMe$_2$]Ni(hfacac)$_2$ | 0.0290 | Me$_2$SiCp$_2$ZrCl$_2$ | 0.007 | 0.24 | 40 (40–49) | 5 | 0 | 103 | 3550 |
| 108 | [(iPr$_2$Ph)$_2$DABMe$_2$]Ni(hfacac)$_2$ | 0.0089 | Me$_2$SiCp$_2$ZrCl$_2$ | 0.0075 | 0.84 | 40 | 5 | 0 | 132 | 14800 |
| 109 | [(iPr$_2$Ph)$_2$DABMe$_2$]Ni(hfacac)$_2$ | 0.0358 | Me$_2$SiCp$_2$ZrCl$_2$ | 0.007 | 0.20 | 50 | 5 | 0 | 203 | 5660 |

(a)Run at 470 psig

TABLE 2

| Run | MI, g/10 mins | HLMI, g/10 mins | Density, g/cc | $M_n$, × 1000 | $M_w$, × 1000 | HI | Branches per 1000 C atoms |
|---|---|---|---|---|---|---|---|
| 101 | 5.2 | 21 | 0.965 | 39 | 111 | 2.82 | nd |
| 102 | high | high | 0.968 | 5.5 | 19.5 | 3.5 | nd |
| 103 | 3.4 | 131 | 0.970 | 13.7 | 62 | 4.6 | nd |
| 104 | 8.5 | 270 | 0.975 | 6.2 | 56 | 9.13 | 2.0 |
| 105 | 0.54 | 14 | 0.929 | 41 | 108 | 2.65 | 18.9 |
| 106 | high | nd | nd | 3.5 | 16 | 4.6 | 0.86 |
| 107 | 0 | 0 | 0.901 | 97 | 1880 | 19.4 | nd |
| 108 | 0 | 0 | 0.913 | 366 | 2030 | 55 | nd |
| 109 | nd | nd | 0.949 | 469 | 1750 | 3.7 | nd | nd = not determined

That which is claimed is:

1. A polymerization process comprising contacting in a reaction zone under slurry polymerization reactor conditions:

a) at least one mono-1-olefin and b) a dual catalyst system comprising a first catalyst system which comprises a metallocene catalyst and a cocatalyst and a second catalyst system which comprises diimine nickel complexes which further comprise additional ligands selected from the group consisting of α-deprotonated-β-diketones and α-deprotonated-β-ketoesters, having a formula selected from the group consisting of Ni(NCR'C$_6$R$_2$H$_3$)$_2$(Y$_2$C$_3$R"$_2$X)$_2$, Ni(NCR'C$_6$R$_2$H$_3$)$_2$(Y$_2$C$_3$R'$_2$X)Z, wherein each R can be the same or different and is selected from the group consisting of branched or linear alkyl or aromatic groups having from about 1 to about 10 carbon atoms per alkyl group and can be in any position on the aromatic ring;

wherein each R' can be the same or different and is selected from the group consisting of hydrogen and linear, branched, cyclic bridging aromatic or aliphatic hydrocarbons, having from about 1 to about 70 carbon atoms per radical group;

wherein each R"CYCXCYR" is a substituent, or ligand, on the diimine nickel complex and can be the same or different and is selected from the group consisting of α-deprotonated-β-diketones, α-deprotonated-β-ketoesters, and mixtures thereof, and wherein each R" and X can be the same or different and are selected from the group consisting of hydrogen and linear, branched, or cyclic bridging aromatic or aliphatic hydrocarbons, and mixtures thereof having from about 1 to about 70 carbon atoms per radical group, optionally containing atoms other than carbon and hydrogen;

wherein each Y can be the same or different and is selected from the group consisting of oxygen, sulfur, and selenium; and wherein Z is a halogen selected from the group consisting of fluorine, chlorine, bromine, iodine, and mixtures thereof; and wherein a polymer is recovered.

2. A process according to claim 1 further comprising contacting a comonomer selected from the group consisting of alpha-olefins having from 2 to 10 carbon atoms per molecule with (a) and (b).

3. A process according to claim 2 wherein said comonomer is selected from the group consisting of propylene, 1-butene, 1-pentene, 1-hexene, 1-octene, 4-methyl-1-pentene, and mixtures thereof.

4. A process according to claim 3 wherein said comonomer is selected from the group consisting of 1-hexene, 4-methyl-1-pentene, and mixtures thereof.

5. A process according to claim 1 wherein said diimine nickel complex is represented by the formulas selected from the group consisting of

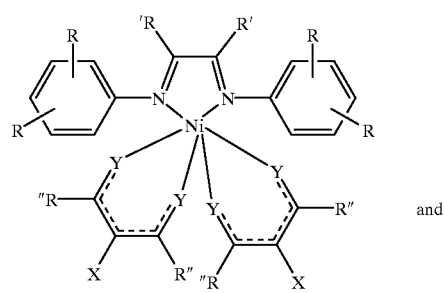 and

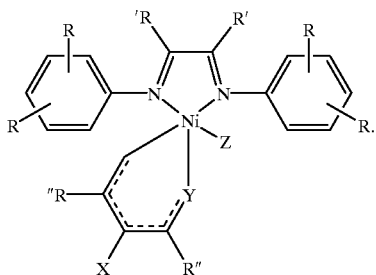

wherein each R can be the same or different and is selected from the group consisting of branched or linear alkyl or aromatic groups having from about 1 to about 10 carbon atoms per alkyl group and can be in any position on the aromatic ring;

wherein each R' can be the same or different and is selected from the group consisting of hydrogen and linear, branched, or cyclic bridging aromatic and aliphatic hydrocarbons, having from about 1 to about 70 carbon atoms per radical group;

wherein each R"CYCXCYR" is a substituent, or ligand, on the diimine nickel complex and can be the same or different and is selected from the group consisting of α-deprotonated-β-diketones, α-deprotonated-β-ketoesters, and mixtures thereof, and wherein each R" and each X can be the same or different and are selected from the group consisting of hydrogen and linear, branched, or cyclic bridging aromatic and aliphatic hydrocarbons, and mixtures thereof having from about 1 to about 70 carbon atoms per radical group, optionally containing atoms other than carbon and hydrogen;

wherein Y can be the same or different and is selected from the group consisting of oxygen, sulfur, and selenium; and wherein Z is a halogen selected from the group consisting of fluorine, chlorine, bromine, iodine, and mixtures thereof.

6. A process according to claim 5 wherein said R substituent is selected from the group consisting of linear or branched alkyl groups having from about 1 to about 8 carbon atoms per group.

7. A process according to claim 6 wherein said R substituent is selected from the group consisting of methyl groups, isopropyl groups, and mixtures thereof.

8. A process according to claim 5 wherein said R' substituent is selected from the group consisting of hydrogen and branched, linear, cyclic, aromatic and aliphatic hydrocarbon radicals and mixtures thereof having from about 1 to about 20 carbon atoms per radical.

9. A process according to claim 8 wherein said R' substituent is selected from the group consisting of hydrogen, methyl groups, ethyl groups, propyl groups, phenyl groups, acenaphthyl groups, cyclobutadienyl groups and mixtures thereof.

10. A process according to claim 5 wherein one said R" and X are selected from the group consisting of hydrogen and linear, branched, or cyclic bridging aromatic or aliphatic hydrocarbon radicals having from about 1 to about 70 carbon atoms per radical group, optionally containing atoms other than carbon and hydrogen and wherein the other said R" is selected from the group consisting of alkoxides of linear, branched, or cyclic bridging aromatic or aliphatic hydrocarbon radicals, and mixtures thereof having from about 1 to about 70 carbon atoms per radical group, optionally containing atoms other than carbon and hydrogen.

11. A process according to claim 5 wherein each said R"CYCXCYR" can be the same or different and is selected from the group consisting of α-deprotonated-β-diketones, α-deprotonated-β-ketoesters, and wherein each R" and each X can be the same or different and are selected from the group consisting of hydrogen and linear, branched, or cyclic bridging aromatic or aliphatic hydrocarbons having from about 1 to about 10 carbon atoms per radical group, optionally containing atoms other than carbon and hydrogen.

12. A process according to claim 11 wherein one said R" and X is selected from the group consisting of hydrogen and linear, branched, or cyclic bridging aromatic or aliphatic hydrocarbons having from about 1 to about 10 carbon atoms per radical group, optionally containing atoms other than carbon and hydrogen and wherein the other R" is selected from the group consisting of the alkoxides of linear, branched, or cyclic bridging aromatic or aliphatic hydrocarbons having from about 1 to about 10 carbon atoms per radical group, optionally containing atoms other than carbon and hydrogen.

13. A process according to claim 5 wherein said R"CYCXCYR" substituent, or ligand, on the diimine nickel complex is selected from the group consisting of 2,4-pentanedione, 1,1,1,5,5,5-hexafluoro-2,4-pentanedione, allylacetonacetate, benzoylacetonate, benzoyl-1,1,1-trifluoroacetone, 1,1,1-trifluoro-2,4-pentanedione, 1-chloro-1,1-difluoroacetylacetone methyl-4,4,4-trifluoroacetoacetate, 1,1,1-trifluoro-5,5-dimethyl-2,4-pentanedione, ethyl alpha-methyl-4,4,4-trifluoroacetoacetate, 4,4,4-trifluoro-1-(2-furyl)-1,3-butanedione, and 2,2-dimethyl-6,6,7,7,8,8,8-heptafluoro-3,5-octanedione; and Z is selected from the group consisting of chloride and bromide.

14. A process according to claim 1 where in said aluminum to nickel molar ratio is within a range of about 50:1 to about 1200:1.

15. A process according to claim 1 wherein said slurry polymerization reactor conditions comprise a reaction temperature within a range of about 10° to about 90° C. and a pressure within a range of about 100 to about 1000 psia.

16. A process according to claim 1 wherein said slurry polymerization reactor conditions comprise a diluent of isobutane.

17. A process according to claim 1 wherein said metallocene catalyst comprises an organometallic compound of the formula:

$$(L)_m M(A)_n$$

wherein each L is a bulky organo ligand, each A is a replaceable group, M is a transition metal selected from Groups III–VI and VIII of the Periodic Table including lanthanide and actinide metals, and m and n are integers such that the total ligand valency corresponds to the valence of M.

18. A process according to claim 17 wherein said metallocene catalyst is formed in the presence of a particulate solid.

19. A process according to claim 1 wherein said cocatalyst is selected from the group consisting of organo aluminoxanes represented by the formulae of $(D—Al—O)_n$ or $D(D—Al—O—)_n AlD_2$, wherein D can be a $C_1$–$C_5$ alkyl radical and "n" is an integer from 1 to about 50.

20. A process according to claim 19 wherein "D" is selected from the group consisting of $C_1$, $C_2$, $C_3$, $C_4$, $C_5$ alkyl radicals and mixtures thereof.

21. A process according to claim 19 wherein "n" is at least four (4).

* * * * *